US012681607B2

(12) United States Patent
Hefiana et al.

(10) Patent No.: US 12,681,607 B2
(45) Date of Patent: *Jul. 14, 2026

(54) TILED INTERACTIVE PHOTONIC SCREEN

(71) Applicant: NANOGA SA, Lausanne (CH)

(72) Inventors: Nasser Hefiana, Lausanne (CH); David Slobodin, Lake Oswego, OR (US)

(73) Assignee: NANOGA SA, Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/891,982

(22) Filed: Sep. 20, 2024

(65) Prior Publication Data

US 2025/0013332 A1    Jan. 9, 2025

Related U.S. Application Data

(63) Continuation of application No. 18/258,176, filed as application No. PCT/IB2020/062190 on Dec. 18, 2020, now Pat. No. 12,124,656.

(51) Int. Cl.
*G06F 3/042* (2006.01)
*G06F 3/03* (2006.01)
*G06F 3/0354* (2013.01)

(52) U.S. Cl.
CPC .......... *G06F 3/0425* (2013.01); *G06F 3/0304* (2013.01); *G06F 3/0317* (2013.01);
(Continued)

(58) Field of Classification Search
CPC .. G06F 3/0425; G06F 3/03545; G06F 3/0304; G06F 3/0317; G06F 3/0321; G06F 2203/04103
(Continued)

(56) References Cited

U.S. PATENT DOCUMENTS 8,120,596 B2    2/2012  Popovich et al.
10,255,017 B2    4/2019  Sun
(Continued)

FOREIGN PATENT DOCUMENTS

CN        104813259 A      7/2015
JP      2001-325069 A     11/2001
(Continued)

OTHER PUBLICATIONS

International Search Report dated Sep. 15, 2021 issued for PCT/IB2020/062190 (4 pages).

*Primary Examiner* — Tom V Sheng
(74) *Attorney, Agent, or Firm* — BLANK ROME LLP

(57)        ABSTRACT

A tiled interactive screen comprises a mounting surface and tiles mounted on the mounting surface. Each tile comprises a tile substrate with photoluminescent marks disposed in a pattern on or in the tile substrate. Each photoluminescent mark is unique with respect to every other photoluminescent mark on any of the tiles, each photoluminescent mark comprises a pattern encoding information specifying the location of the photoluminescent mark on the tile, and each tile substrate is at least partially transparent to light absorbed by the photoluminescent marks and is at least partially transparent to light emitted by the photoluminescent marks. The photoluminescent marks respond to stimulating electromagnetic radiation by emitting electromagnetic radiation. A tiled photonic interactive system comprises a tiled photonic interactive screen and an optical stylus operable to emit stimulating radiation onto one or more photoluminescent marks and respond to electromagnetic radiation emitted by the stimulated photoluminescent marks.

13 Claims, 17 Drawing Sheets

(52) U.S. Cl.
  CPC ........ _G06F 3/0321_ (2013.01); _G06F 3/03545_
          (2013.01); _G06F 2203/04103_ (2013.01)
(58) Field of Classification Search
  USPC ......................................................... 345/175
  See application file for complete search history.

(56)                    References Cited

U.S. PATENT DOCUMENTS

|  |  |  |  |  |
|---|---|---|---|---|
| 12,124,656 B2* | 10/2024 | Hefiana | .................. | G06F 3/042 |
| 2003/0234343 A1 | 12/2003 | Cok et al. | | |
| 2004/0012565 A1 | 1/2004 | Cok | | |
| 2004/0175842 A1 | 9/2004 | Roitman et al. | | |
| 2010/0277064 A1 | 11/2010 | Cok et al. | | |
| 2011/0057861 A1 | 3/2011 | Cok et al. | | |
| 2013/0153787 A1 | 6/2013 | Geaghan et al. | | |
| 2014/0012349 A1 | 1/2014 | Zimmerling | | |
| 2014/0117252 A1 | 5/2014 | Craft | | |
| 2014/0145066 A1* | 5/2014 | Geaghan | .............. | G06F 3/0317 |
| | | | | 250/206.1 |
| 2014/0168089 A1 | 6/2014 | Geaghan | | |
| 2015/0261317 A1 | 9/2015 | Geaghan et al. | | |
| 2017/0047393 A1 | 2/2017 | Bower et al. | | |
| 2020/0241828 A1 | 7/2020 | Noyelle et al. | | |
| 2020/0295120 A1 | 9/2020 | Bower et al. | | |
| 2021/0149557 A1* | 5/2021 | Hefiana | .............. | G06F 3/03542 |

FOREIGN PATENT DOCUMENTS

| | | | |
|---|---|---|---|
| JP | 2015535641 A | 12/2015 | |
| TW | 201037390 A | 10/2010 | |
| TW | 201809741 A | 3/2018 | |
| WO | 2010/0095140 A2 | 8/2010 | |
| WO | 2017/164475 A1 | 9/2017 | |
| WO | 2019087038 A1 | 5/2019 | |

* cited by examiner

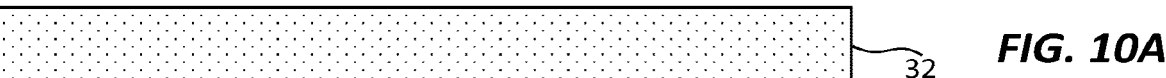
_FIG. 10A_
_FIG. 10B_
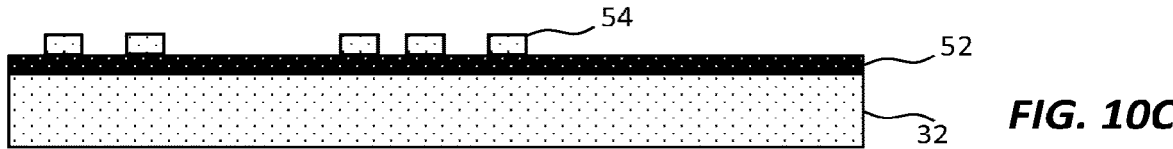
_FIG. 10C_
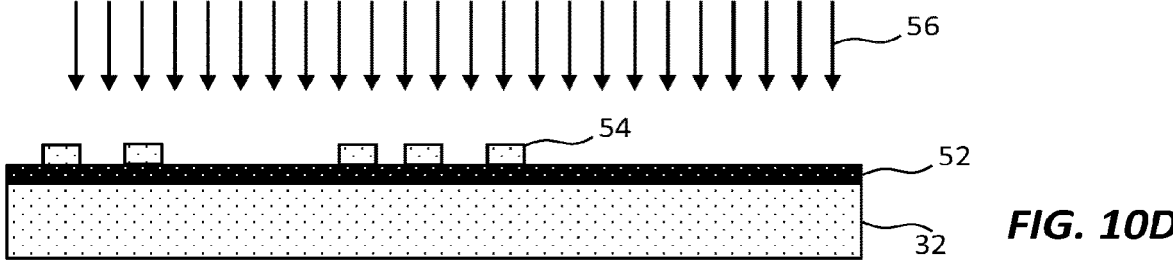
_FIG. 10D_

TILED INTERACTIVE PHOTONIC SCREEN

CROSS REFERENCE TO RELATED APPLICATIONS

This application is related to WO 2019/087038 filed Oct. 29, 2018, entitled Device for a Digital Writing Instrument by Hefyene, whose contents are incorporated herein by reference.

TECHNICAL FIELD

The present disclosure relates to user-interactive screens in computer systems that comprise multiple tiles, for example in combination with large-format displays.

BACKGROUND

Flat-panel displays are widely used as a visual computer interface for users. In many applications, touch screens are combined with flat-panel displays to enable user interaction with computers. Such touch screens are typically mounted directly on the surface of, or are a layer in, an interactive flat-panel display of a computer system. Modern touch screens typically detect touches through changes in capacitance or resistance at locations on the touch screen. The locations of the changes are electronically detected and communicated to the computer system. Interactive screens relying on cameras to detect touch, interactive screens using crossed beams of infrared light, and optical touch screens that respond to light shining on particular locations of an interactive screen are also known.

U.S. Pat. No. 9,068,845 entitled Optical Digitizer System with Position-Unique Photoluminescent Indicia by Geaghan et al describes an interactive optical "digitizer system including a substrate having a position unique photoluminescent indicia pattern. A stylus component receives optical signals indicative of the indicia pattern and determines therefrom the position of the stylus relative to the substrate." However, such a system is limited in size to the size of the substrate. A tiled touch system using multiple digital cameras is disclosed in U.S. Pat. No. 8,120,596 and a tiled touch system using infrared emitters and receivers is illustrated in U.S. Pat. No. 10,255,017. However, such systems can be complex or difficult to construct or use.

As many large flat-panel displays are too large to construct on a single substrate, and user interaction with such large flat-panel displays is desirable, there remains a need for a simple, inexpensive, interactive screen that can be made in any size.

SUMMARY

The present invention includes, among various embodiments, a tiled photonic interactive screen comprising a mounting surface and tiles mounted on the mounting surface. Each tile comprises a tile substrate with photoluminescent marks disposed in a pattern on or in the tile substrate, each photoluminescent mark is unique with respect to every other photoluminescent mark on any of the tiles, each photoluminescent mark comprises a pattern encoding information uniquely identifying or specifying the location of the photoluminescent mark on the tile, and each tile substrate is at least partially transparent to light absorbed by the photoluminescent marks and is at least partially transparent to light emitted by the photoluminescent marks.

According to some embodiments, the tiles are disposed in a regular rectangular array. According to some embodiments, the mounting surface is a display or a surface of a display.

According to some embodiments, the photoluminescent marks are responsive to stimulating electromagnetic radiation to emit electromagnetic radiation. The stimulating electromagnetic radiation can be partially visible to the human visual system and can comprise light in the near infrared spectrum having a wavelength in the range 650-800 nm. The stimulating electromagnetic radiation can be invisible to the human visual system and can comprise light in the infrared spectrum having a wavelength greater than 800 nm. The stimulating electromagnetic radiation can be invisible to the human visual system and can comprise ultraviolet light. The emitted electromagnetic radiation can be infrared or near-infrared. The stimulating electromagnetic radiation can have a different frequency than the emitted electromagnetic radiation.

According to embodiments of the present disclosure, the photoluminescent marks can comprise a material stack. Each material stack can comprise at least one successive pairs of layers and each pair of layers can comprise a first layer of a first material with a thickness of less than or equal to 1 micron alternating with a second layer of a second material with a thickness of less than or equal 10 nm. The interface between the first layer and the second layer of the pairs of layers can include quantum nano-structures, for example photoluminescent quantum nano-structures.

According to embodiments of the present disclosure, a tiled photonic interactive system comprises a tiled photonic interactive screen and an optical stylus operable to emit stimulating radiation onto one or more photoluminescent marks and respond to electromagnetic radiation emitted by the stimulated photoluminescent marks. The optical stylus can comprise a light source that emits stimulating radiation onto the luminescent marks or the optical stylus can comprise a camera that responds to electromagnetic radiation emitted by the photoluminescent marks, or both. The digital camera can have a field of view that includes all of the tiles. The digital camera can have a field of view that includes fewer than all of the tiles.

The tiles can be disposed on a display comprising a display controller.

According to embodiments of the present disclosure, a method of operating a tiled photonic interactive system can comprise providing a tiled photonic interactive system, recording a tile location of each tile with respect to other tiles and at least one photoluminescent marks disposed on the tile, exposing a photoluminescent mark of at least one tile to stimulating electromagnetic radiation, recording the encoded information, and determining location information derived from the encoded information and the tile location of the corresponding tile. Recording the tile location of each tile with respect to other tiles and at least one of the photoluminescent marks can comprise recording a tile identifier that identifies the location of the tile in the array. Recording the tile location of each tile in the array with respect to the photoluminescent marks can comprise exposing at least one unique photoluminescent mark of each tile to stimulating radiation and recording the location of the emitted electromagnetic radiation with respect to the tile location of the tile.

According to embodiments of the present disclosure, a tiled photonic interactive screen comprises a mounting surface and tiles mounted on the mounting surface. Each tile can comprise a tile substrate with unique photoluminescent marks disposed in an array on the tile substrate. The information encoded in photoluminescent marks on a tile can incorporate an identification of the tile or the location of the tile with respect to the tiles mounted on the mounting surface. The tile substrate can comprise two or more layers. The photoluminescent marks can be disposed between the tile substrate and the mounting surface or between two layers of the two or more layers. The two or more layers can be adhered to each other or to the mounting substrate with an index-matched optically clear adhesive. According to some embodiments, the tile substrates are adhered together with a light-absorbing adhesive, e.g., in seams between adjacent tile substrates.

According to some embodiments, the mounting surface is a tiled mounting surface comprises mounting tiles, one tile is mounted on each mounting tile, multiple tiles are mounted on each mounting tile, or a tile is mounted on multiple mounting tiles.

According to some embodiments of the present disclosure a method of making a tiled photonic interactive screen comprises providing a tiled substrate, disposing a photoluminescent layer comprising quantum nano-structures on the tiled substrate, masking the photoluminescent layer to form masked portions and unmasked portions, deactivating unmasked portions of the photoluminescent layer, and removing the mask. According to some embodiments, deactivating unmasked portions of the photoluminescent layer can comprise exposing the unmasked portions to energetic particles, leaving the deactivated photoluminescent layer portions in place. According to some embodiments, deactivating unmasked portions of the photoluminescent layer comprises exposing etching the unmasked portions to remove the unmasked portions and expose corresponding unmasked portions of the tile substrate.

Some optional methods of the present disclosure comprise planarizing the photoluminescent layer.

Embodiments of the present disclosure provide a simple, inexpensive, and optical interactive screen that can be made in any size.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which:

FIGS. 10A-10D are sequential structures formed according to illustrative methods of the present disclosure;

Figure 1A:
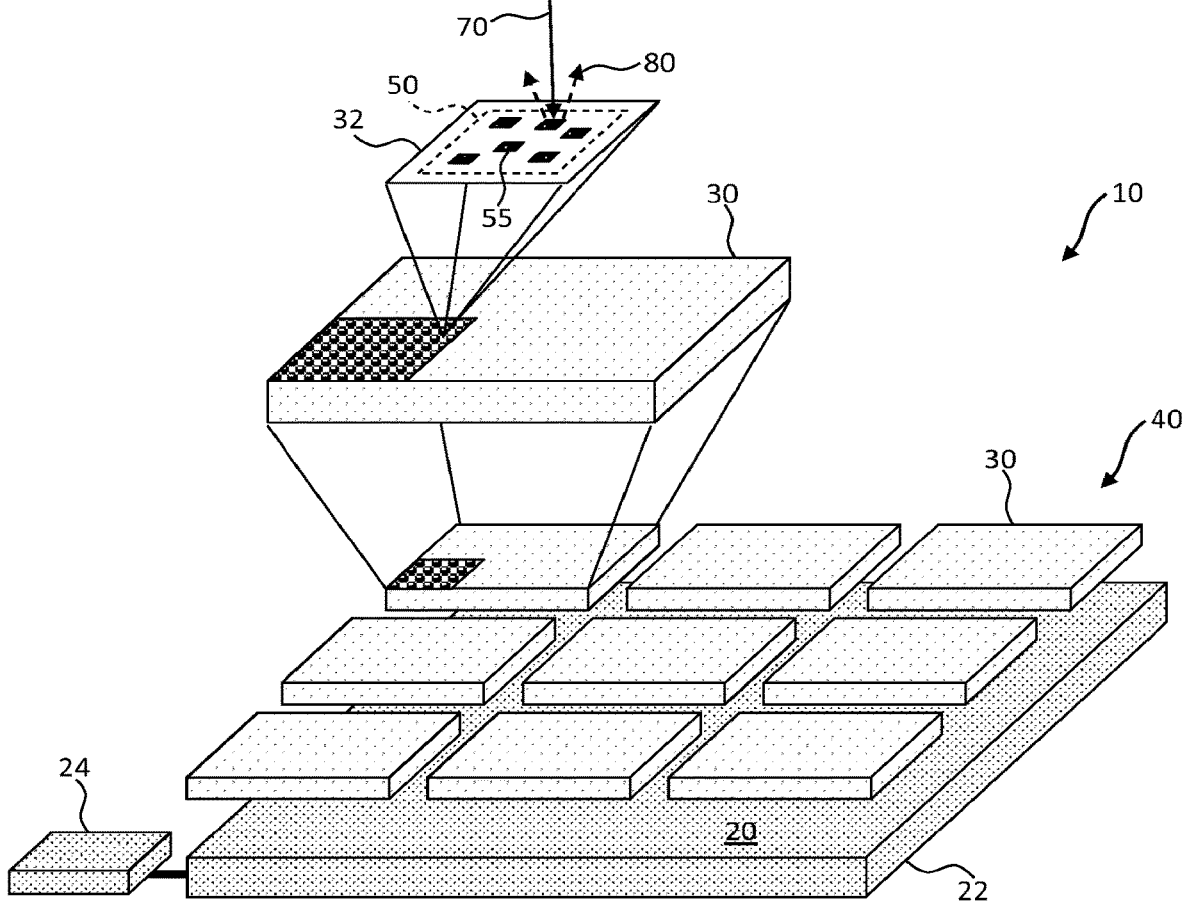
FIG. 1A is an exploded perspective and detail of a tiled photonic interactive screen according to illustrative embodiments of the present disclosure.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The figures are not drawn to scale since the variation in size of various elements in the Figures is too great to permit depiction to scale.

DETAILED DESCRIPTION OF CERTAIN EMBODIMENTS

Embodiments of the present disclosure provide, inter alia, simple, inexpensive, and interactive screens that can be made in any size. The interactive screens can be mounted on a display or display surface under the control of a computer to provide a user interface to the computer and a user can interact with the computer through the interactive screen.

Figure 1B:
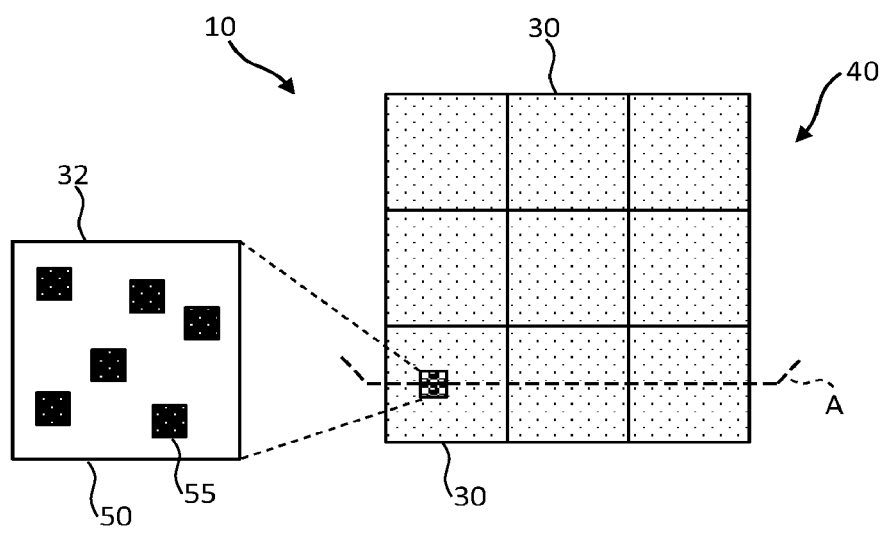
FIG. 1B is a plan view and detail of the tiled photonic interactive screen of FIG. 1A according to illustrative embodiments of the present disclosure.
Figure 1C:
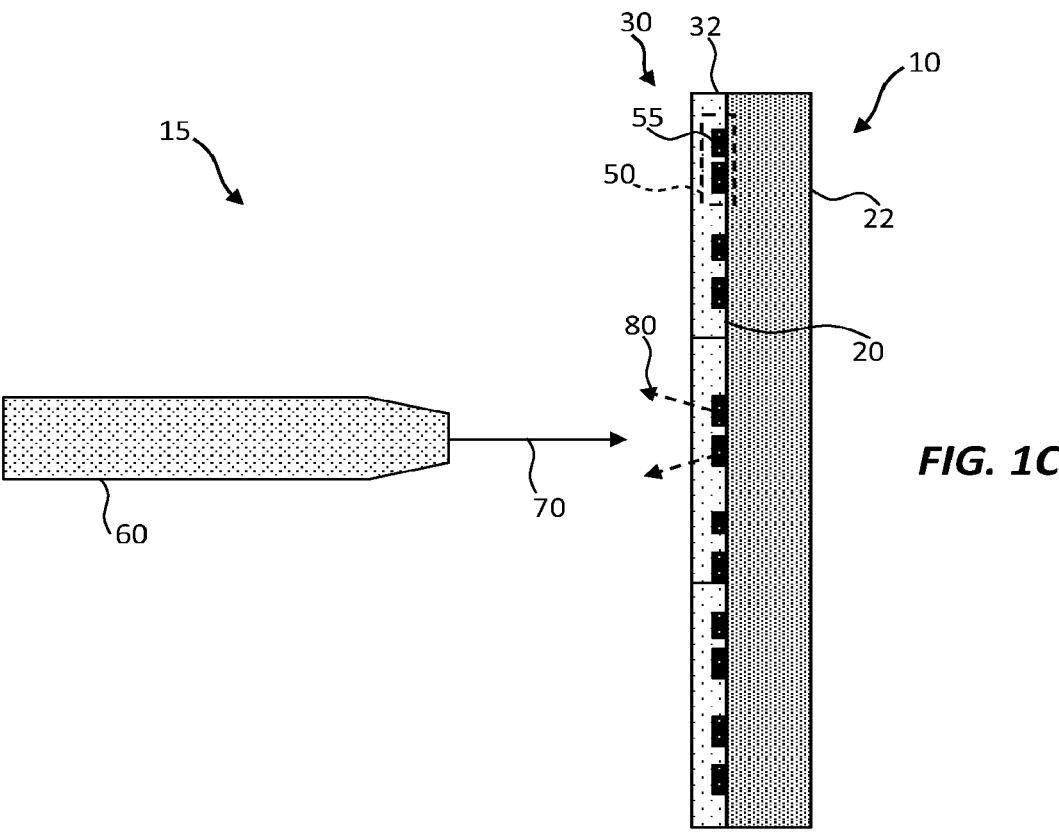
FIG. 1C is a cross section of the tiled photonic interactive screen of FIG. 1B taken along cross section line A together with an optical stylus according to illustrative embodiments of the present disclosure.

According to some embodiments of the present disclosure and as illustrated in FIGS. 1A-1C, a tiled photonic interactive screen 10 comprises a mounting surface 20 and tiles 30 (e.g., screen tiles 30) mounted on mounting surface 20. Each tile 30 comprises a tile substrate 32 with photoluminescent marks 50 disposed in a pattern on or in tile substrate 32. Each photoluminescent mark 50 is unique with respect to every other photoluminescent mark 50 on any of tiles 30. Each photoluminescent mark 50 comprises a pattern of individual marks 55 encoding information uniquely identifying or specifying the location of photoluminescent mark 50 on tile 30. Each tile substrate 32 is at least partially transparent to stimulating light 70 absorbed by photoluminescent marks 50 (stimulating electromagnetic radiation) and is at least partially transparent to emitted light 80 emitted by photoluminescent marks 50 (emitted electromagnetic radiation). Mounting surface 20 can be a surface of a display 22, with or without a mechanical frame, and controlled by a display controller 24. As shown in FIG. 1C, optical stylus 60 can emit stimulating light 70 and receive emitted light 80 from tiled photonic interactive screen 10.

Figure 1D:
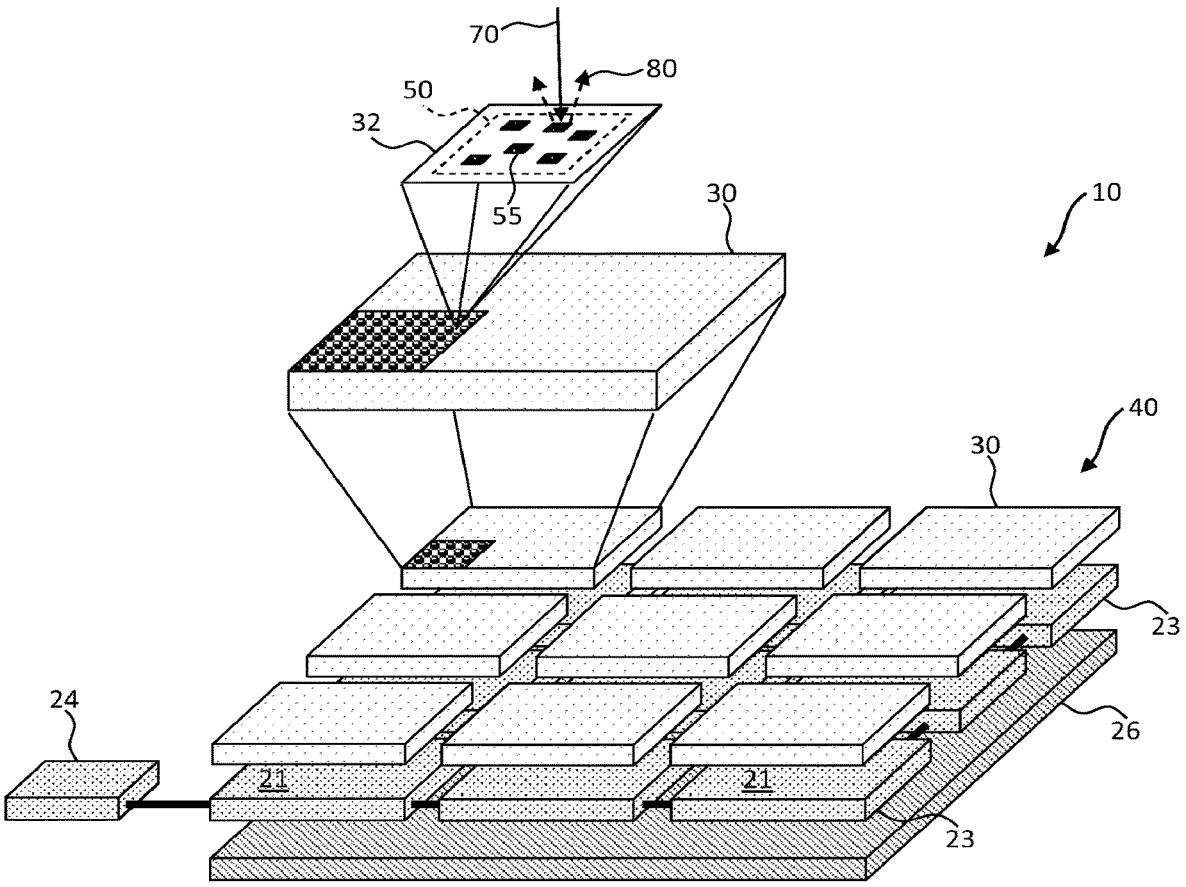
FIGS. 1D and 1E are exploded perspectives of a tiled photonic interactive screen mounted on a tiled display according to illustrative embodiments of the present disclosure.
Figure 1E:
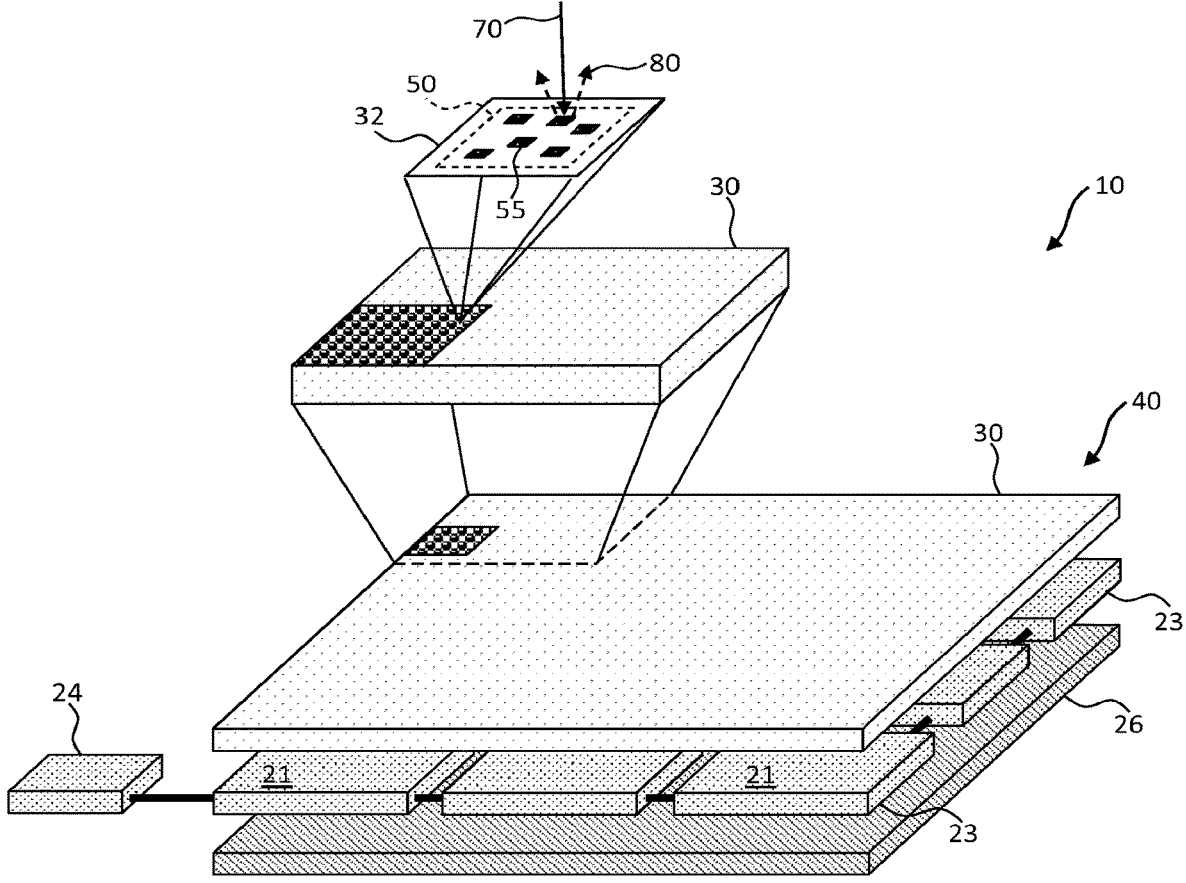
Figures 1F, 1G:
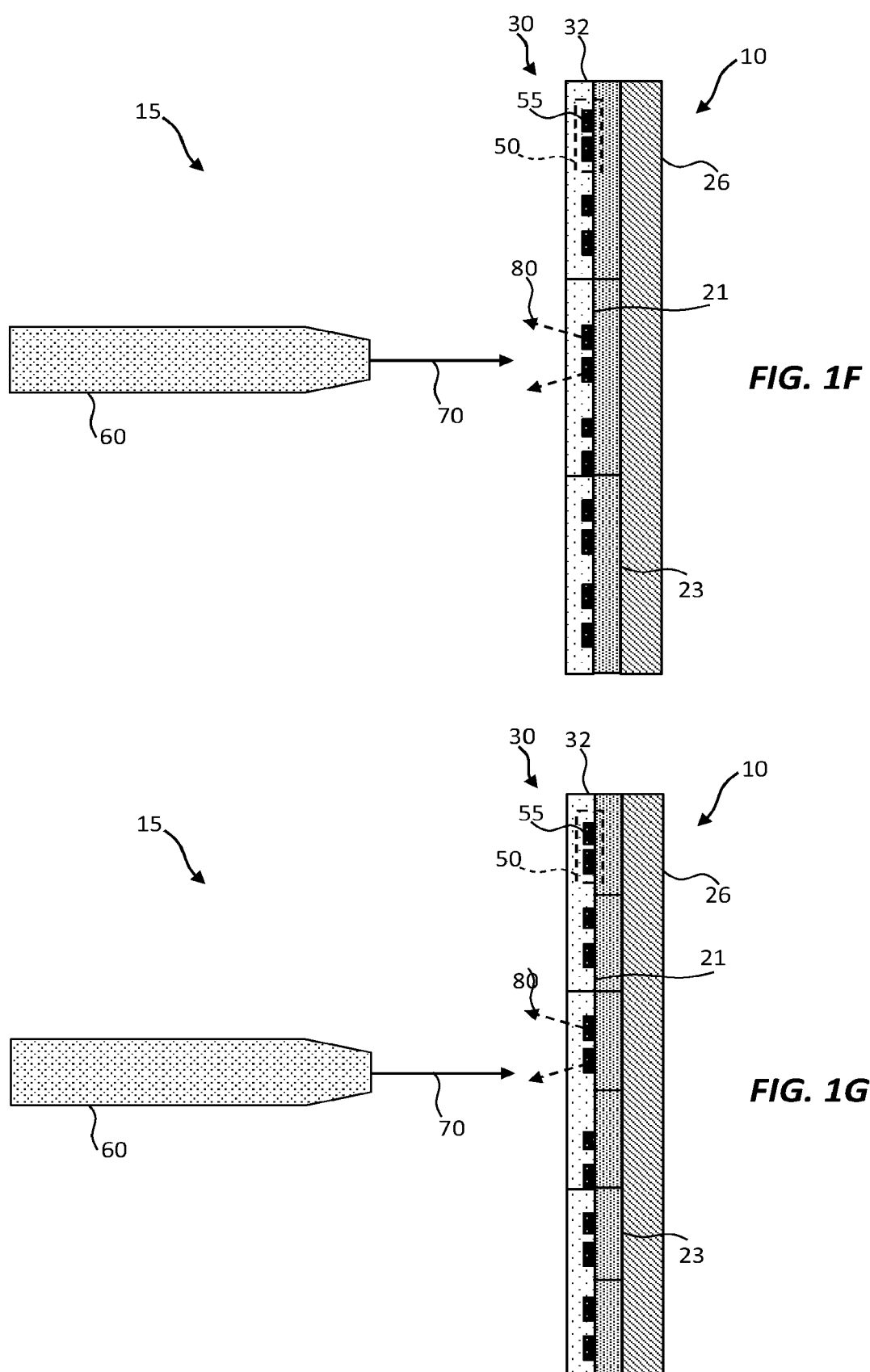
FIGS. 1F-1H are cross sections of a tiled photonic interactive screen mounted on a tiled display according to illustrative embodiments of the present disclosure.
Figure 1H:
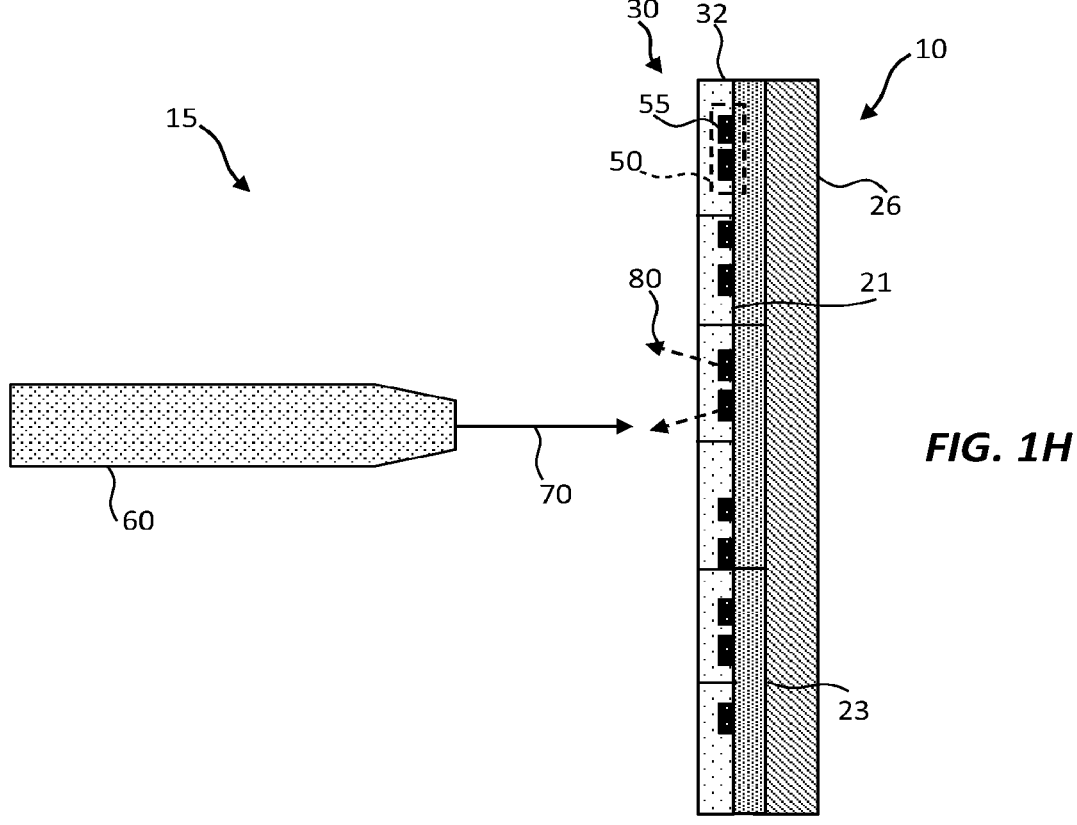

FIGS. 1A-1C and 3A illustrate embodiments in which multiple tiles 30 are disposed on a display 22. As illustrated in FIGS. 1D-1H and 3B-3D, display 22 can be a tiled display 22 disposed in or on a mechanical frame 26 (e.g., a display frame 26) and can comprise display tiles 23 having a tiled mounting surface 21 on which are mounted tiles 30. In some embodiments and as shown in the perspective of FIG. 1D, cross section of FIG. 1F, and perspective of FIG. 3B an individual tile 30 is mounted on a tiled mounting surface 21 (e.g., cover glass) of each display tile 23. In some embodiments and as shown in the perspective of FIG. 1E, the cross section of FIG. 1G, and the perspective of FIG. 3D, each tile 30 is mounted on a tiled mounting surface 21 of a plurality of display tiles 23. FIG. 1E illustrates only one tile 30 of tiled photonic interactive screen 10; FIGS. 1G and 3D show multiple tiles 30. In some embodiments and as shown in the cross section of FIG. 1H and perspective of FIG. 3C, a plurality of tiles 30 is mounted on tiled mounting surface 21 of each single display tile 23 so that display 22 comprises multiple display tiles 23 and multiple tiles 30 are mounted on each display tile 23. Display 22 can be, but is not limited to, a liquid crystal display 22, an organic light-emitting diode display 22, or an inorganic light-emitting diode display 22. Display 22 can be a large-format display 22, for example a display 22 having a diagonal of no less than 3 meters, 5 meters, 10 meters, 15 meters, 20 meters, or 50 meters.

Mounting surface 20 can be any suitable surface on which tiles 30 can be mounted, for example a display 22 or display cover glass. Mounting surface 20 can be substantially or effectively transparent to visible light and can be substantially planar, e.g., within manufacturing limitations. Mounting surface 20 can be, for example, a surface of a glass or polymer substrate. Tiles 30 can comprise any suitable tile substrate 32 that can be mounted on mounting surface 20 and on or in which photoluminescent marks 50 can be disposed. For example, tiles 30 can each comprise a glass or polymer tile substrate 32 and can be substantially or effectively transparent to visible display light, for example light emitted by a display 22. Tiles 30 can be, but are not necessarily, disposed in a regular rectangular array 40 over mounting surface 20.

According to embodiments of the present disclosure, each photoluminescent mark 50 can comprise an array of individual marks 55 (e.g., indicia or points) disposed on or in tile substrate 32. Individual marks 55 of a photoluminescent mark 50 of a tile 30 can together encode (e.g., uniquely identify or uniquely specify) the location of photoluminescent mark 50 on tile 30 and in tiled photonic interactive screen 10. Individual marks 55 can be, for example but without limitation, a 2D bar code or an arrangement of dots in a pattern that encodes or identifies the location of the corresponding photoluminescent mark 50. The pattern of individual marks 55 can comprise a series of N points distributed in a two-dimensional array on a surface of tile substrate 32 or in tile substrate 32. The N points can define an active area of photoluminescent mark 50, and an inactive area can be defined by the area between the N points. In some embodiments, the N points can define an inactive area and the active area can be defined by the area between the N points. The distribution of the N points in the pattern encodes location information of the pattern (photoluminescent mark 50) so that it is possible to determine a unique value representing an identification or location depending on the radiation emitted by the photoluminescent material (either from the N points or from the space between the N points) of the location.

For example, a 4×4 array of individual marks 55 in a photoluminescent mark 50 can encode $2^{16}$ (equaling 65,536) binary marks or one of 256 locations in each dimension of a two-dimensional display 22 on which tiled photonic interactive screen 10 is mounted. Photoluminescent marks 50 can be arranged in two dimensions over tile substrate 32 and have a separation in an x direction, in a y direction orthogonal to the x direction, or both, of no greater than 5 mm, for example no greater than 250 microns, no greater than 500 microns, no greater than 1 mm, no greater than 1.5 mm, no greater than 2 mm, or no greater than 3 mm.

Each photoluminescent mark 50 is disposed on a tile substrate 32 and comprises a plurality of individual marks 55 disposed in a pattern, for example an array, that encodes the location or identification of photoluminescent mark 50 on tile substrate 32. Individual marks 55 of photoluminescent marks 50 can absorb light and emit light in response. As used herein, light refers to all frequencies of electromagnetic radiation that are visible to the human visual system, that is absorbed by individual marks 55, or that is emitted by individual marks 55. Visible light is electromagnetic radiation that is visible to the human visual system. Thus, photoluminescent marks 50 can be responsive to stimulating electromagnetic radiation (stimulating light 70) to emit electromagnetic radiation (emitted light 80). In embodiments of the present disclosure, stimulating light 70 is partially visible to the human visual system and comprises light in the near infrared spectrum having a wavelength in the range 650-800 nm. In some embodiments, stimulating light 70 is not visible to the human visual system and comprises light in the infrared spectrum having a wavelength greater than 800 nm. In some embodiments, stimulating light 70 is not visible to the human visual system and comprises ultraviolet light. Ultra-violet light can be electromagnetic radiation having a wavelength less than 400 nm. In some embodiments, emitted light 80 is infrared, near-infrared, ultra-violet, or visible. Stimulating light 70 can have a different frequency than emitted light 80.

Photoluminescent marks 50 and individual marks 55 can comprise a material stack disposed on tile substrate 32. Each material stack can comprise one or more successive pairs of layers, each pair of layers comprising a first layer of a first material with a thickness of less than or equal to 1 micron alternating with a second layer of a second material with a thickness of less than or equal to 10 nm, wherein the interface between the first layer and the second layer of the pairs of layers includes quantum nano-structures. The quantum nano-structures can be photoluminescent and can absorb light (e.g., stimulating light 70) and emit light (e.g., emitted light 80) in response. The stack can comprise layers of metal nitride and/or oxide that generate the photoluminescent quantum nano-structures at the interface of the layers. In some embodiments, the first layer and/or the second layer comprises an alloy, for instance a metal oxide alloy or a nitride oxide alloy. The metal oxide/nitride alloy presents a different bandgap energy level from the metal oxide/nitride layer. When the first and/or second layer is replaced by an alloy, it forms a different stack with quantum structures exhibiting modified photoluminescent properties, for instance a different range of emission. In an embodiment, the metal oxide is chosen from among SiOx, ZnO, or an alloy of metal oxide. In one embodiment, the metal nitride is chosen from among AlN, GaN, InN or an alloy of the metal nitride.

In some embodiments, the stack further comprises at least one third layer between the first layer and the second layer, or between two first layers or between two second layers, for instance one third layer, or two third layers, or three third layers. The additional layer, for instance the third layer, can modify the quantum structures present at the interface, and thus the photoluminescent properties, for instance the range of emission. The third layer can form an alloy with the first layer or with the second layer. In some embodiments, the additional layer comprises a metal sulphide, preferably chosen among ZnS, CdS, or an alloy of metal sulfide. In some embodiments, the additional layer comprises cadmium telluride or cadmium selenide, preferably chosen or an alloy of cadmium telluride and cadmium selenide. In some embodiments, the additional layer comprises a metal arsenide, preferably chosen among AlAs, GaAs or an alloy of metal arsenide.

Upon receiving stimulating light 70, the stack emits visible, IR, or UV light (e.g., electromagnetic radiation) at a determined wavelength (e.g., emitted light 80). The wavelength of emitted light 80 depends on the composition of the metal nitride and/or oxide of the layers and on the thickness of the stack. In some embodiments, the photoluminescent stack is treated to provide non-photoluminescent portions of the stack. This facilitates manufacturing the pattern of individual marks 55. Thus, the stack can be made uniformly over tile substrate 32 and then treated to pattern individual marks 55 and distinguish the active area from the inactive area in the pattern. For example, a treatment can modify (e.g., deactivate) the quantum structures present within the stack and significantly diminish their photoluminescent characteristics, so the emitted-light receiver 64 (e.g., camera 64) can easily distinguish between the photoluminescent and the deactivated non-photoluminescent material. In embodiments of the present disclosure, the composition, and/or the thickness of the first and second layers can be tuned depending on the excitation wavelength (stimulating light 70) and/or on the emission wavelength (emitted light 80). In some embodiments, the excitation wavelength of the stack is between about 360 nm and 375 nm, preferably 360 nm and 370 nm, in particular 365 nm. In some embodiments, the emission wavelength of the stack is between about 600 nm and 850 nm, preferably 650 nm and 700 nm, in particular 670±20 nm.

In some embodiments, each of the N points (individual marks 55) have dimensions between 2 μm and 400 μm, preferably between 20 μm and 200 μm, in particular 50 μm. The smaller the dimensions of the points (individual marks 55), the denser the distribution of the N points in the pattern and the higher the resolution of tiled photonic interactive screen 10. For instance, for small devices with sizes between 5 and 12 inches (typically smartphones and tablets), point dimensions ranging from 5 to 15 μm are preferable in order to insure a good resolution. For larger devices with sizes from 15 to 30 inches (typically laptops and desktop computers), point dimensions ranging from 15 to 30 μm provide appropriate resolution. For much larger devices with sizes above 40 inches (typically TVs and digital whiteboards), point dimensions ranging from 50 to 200 μm are useful. WO2019/087038 referenced above describes a suitable layer structure that can be used to construct individual marks 55 and its contents are incorporated herein by reference. The material stack can be substantially transparent, for example more than 50%, 60%, 70%, or 80% transparent to light or to visible light.

Figure 2A:
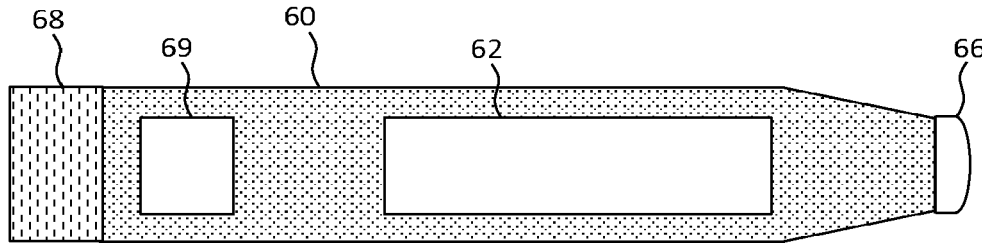
FIG. 2A is a schematic cross section of an optical stylus useful in illustrative embodiments of the present disclosure.
Figure 2B:
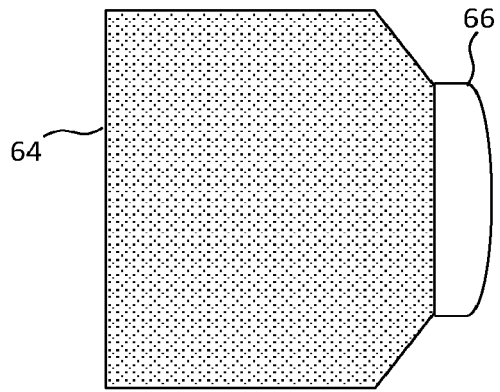
FIG. 2B is a schematic cross section of an optical camera useful in illustrative embodiments of the present disclosure.
Figure 2C:
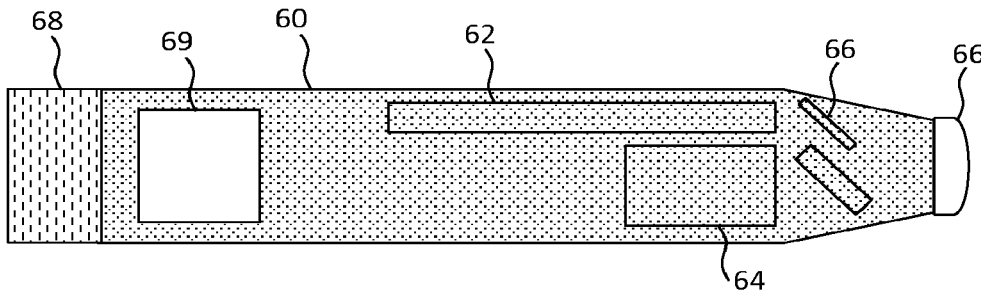
FIG. 2C is a schematic cross section of an optical stylus incorporating a light source and camera useful in illustrative embodiments of the present disclosure.

According to some embodiments of the present disclosure and as illustrated in FIG. 1C, a tiled photonic interactive system 15 comprises a tiled photonic interactive screen 10 and an optical stylus 60 operable to emit stimulating light 70 onto photoluminescent marks 50 and respond to emitted light 80 emitted by photoluminescent marks 50. As illustrated in FIGS. 2A and 2C, optical stylus 60 can be a hand-held battery-operated electro-optic device that comprises a light source 62 that emits stimulating light 70 (electromagnetic radiation) onto at least one of photoluminescent marks 50, causing stimulated photoluminescent mark(s) 50 to emit emitted light 80. Light source 62 can be, for example, a laser or an LED (e.g., an infrared or UV light source 62). In some embodiments, optical stylus 60 comprises an emitted-light receiver 64, for example a camera 64 such as a digital camera 64, that responds to emitted light 80 emitted by photoluminescent marks 50 (for example individual marks 55 of photoluminescent marks 50). Thus, camera 64 can be an infrared light camera 64 or ultraviolet light camera 64. Optical stylus 60 can comprise optical elements 66, for example mirrors, partially reflective mirrors, and lenses to suitable concentrate, disperse, direct or otherwise manipulate stimulating light 70 emitted from light source 62 or emitted light 80 received from photoluminescent marks 50. Optical stylus 60 can comprise one or more control switches 68 (e.g., rotary, slide, or pushbutton switches) to control the operation of optical stylus 60 and a communication circuit 69 to communicate with a system controller (e.g., a display controller 24 shown in FIG. 1A) that controls display 22 in response to optical stylus 60 or to process received images from camera 64 and decode patterns in the images. Communication circuit 69 can be one or more integrated circuits and can comprise a processor, memory, and network and radio circuits, e.g., a computer, random access memory, and a Bluetooth or a WiFi device. A Bluetooth device is preferred in some embodiments where a computer network is not needed or available. Camera 64 can be separate from optical stylus 60 (as shown in FIG. 2B) or can be integrated into optical stylus 60, for example into a body or a barrel of optical stylus 60 (as shown in FIG. 2C). Camera 64 can be a digital camera 64 with a CCD sensor or a CMOS sensor and one or more light filters to respond to desired wavelengths of light. In some embodiments, a CMOS sensor can be preferred.

Figures 3A, 3B:
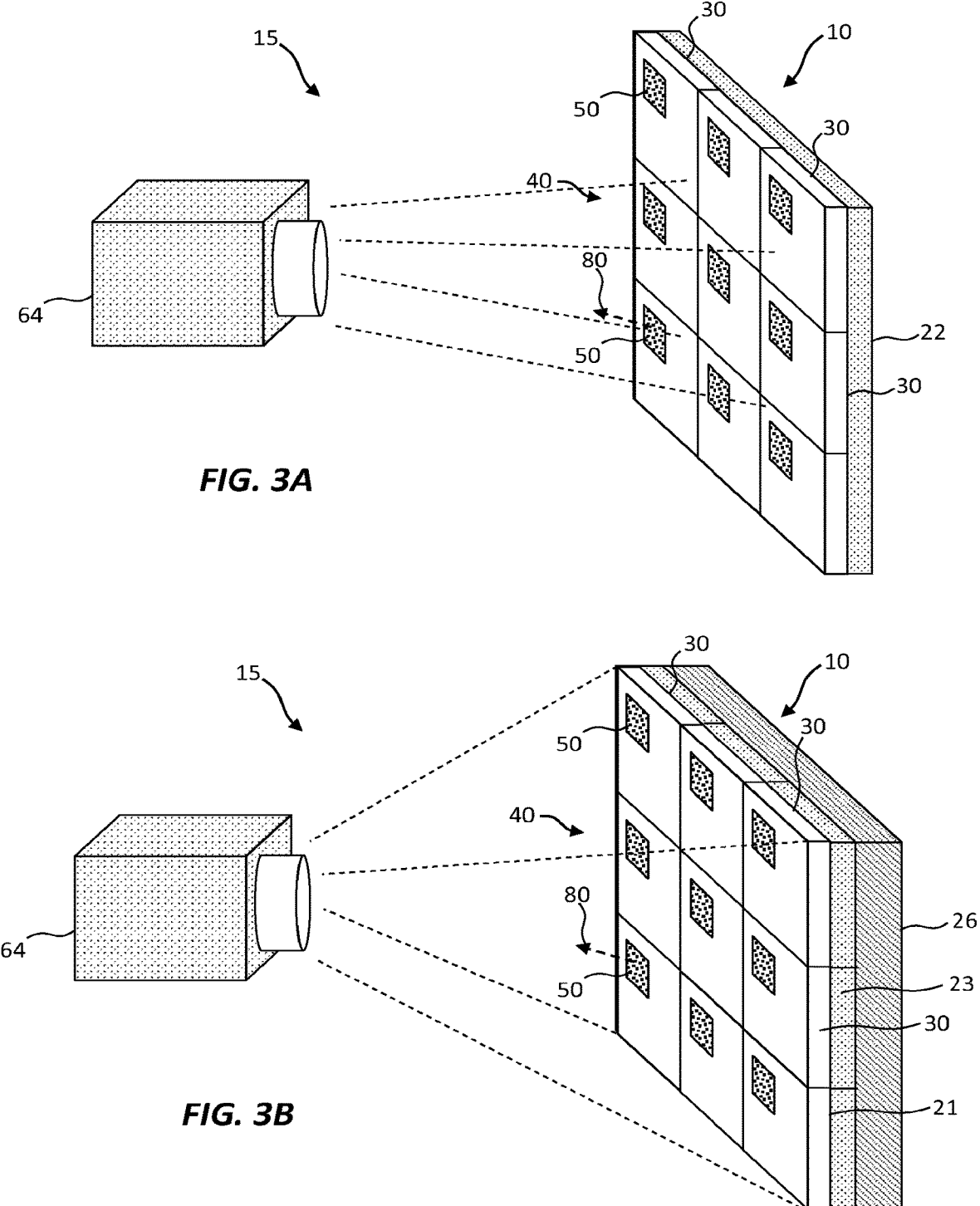
FIG. 3A is a perspective of a tiled photonic interactive screen mounted on a display and a camera according to illustrative embodiments of the present disclosure.
FIGS. 3B-3D are perspectives of a tiled photonic interactive screen mounted on a tiled display and a camera according to illustrative embodiments of the present disclosure.

According to some embodiments, camera 64 can have a field of view that includes all of tiles 30, e.g., as shown in FIG. 3B. According to some embodiments, camera 64 can have a field of view that includes fewer than all of tiles 30, e.g., as shown in FIG. 3A. For example, camera 64 can have a field of view that is approximately 3 mm in diameter and can receive emitted light 80 from a two-by-two array of photoluminescent marks 50. According to some embodiments, camera 64 can have a field of view that can receive emitted light 80 from more than a two-by-two array of photoluminescent marks 50, for example but not limited to a two-by-three or three-by-three array of photoluminescent marks 50.

Tiled photonic interactive screen 10 can be constructed by providing tile substrates 32 with photoluminescent marks 50 disposed on each tile 30, where each photoluminescent mark 50 is unique and is associated with the location of photoluminescent mark 50 on corresponding tile 30 on which photoluminescent mark 50 is disposed. One or more photoluminescent marks 50 of each tile 30 can be recorded, for example in a memory. For example, each tile 30 can have an associated identification (ID) such as a serial number or a number representative of a tile 30 location in an array 40 of tiles 30 that is also associated with and encoded in photoluminescent marks 50 on that tile 30. Thus, in some embodiments, recording the tile location of each tile 30 in array 40 of tiles 30 with respect to photoluminescent marks 50 can comprise recording a tile identifier that identifies the location of tile 30 in array 40. In some embodiments of the present disclosure, when tiles 30 are assembled, the location of each tile 30 in array 40 of tiles 30 together with its ID (or record of its unique photoluminescent marks 50) can be stored in a memory, for example in display controller 24 or communication circuit 69. Thus, in some embodiments, photoluminescent mark 50 encodes a location of photoluminescent mark 50. In some embodiments photoluminescent mark 50 encodes a unique identifier that is associated with (e.g., in a lookup table recorded in a memory) the location of photoluminescent mark 50.

Tiled photonic interactive screen 10 and tiled photonic interactive system 15 provide a way for users of a computer system to interact with a large-format display 22, for example a large-format display 22 having an area that is too large or too remote for a user to touch in all locations. Optical stylus 60 enables a user interacting with display 22 all of which he or she cannot reach with a finger to indicate any portion of display 22 with a beam of light. The beam of light stimulates photoluminescent marks 50 to emit a pattern of emitted light 80 corresponding to the pattern of individual marks 55 in photoluminescent marks 50. The pattern of emitted light 80 is received by camera 64, an image of photoluminescent marks 50 stored in a memory, for example in communication circuit 69, the pattern detected and decoded to indicate the position of photoluminescent marks 50 and communicated to display controller 24. Display controller 24 then associates the decoded photoluminescent mark 50 with a corresponding tile 30 with the recorded association, determines the location of corresponding tile 30 in array 40 of tiles 30, combines the location of photoluminescent mark 50 with the location of the corresponding tile 30, and calculates the location of photoluminescent mark 50 in array 40 of tiles 30. Display controller 24 then performs an appropriate action responsive to the location of photoluminescent mark 50 or communicates location information to a computer.

Figure 4:
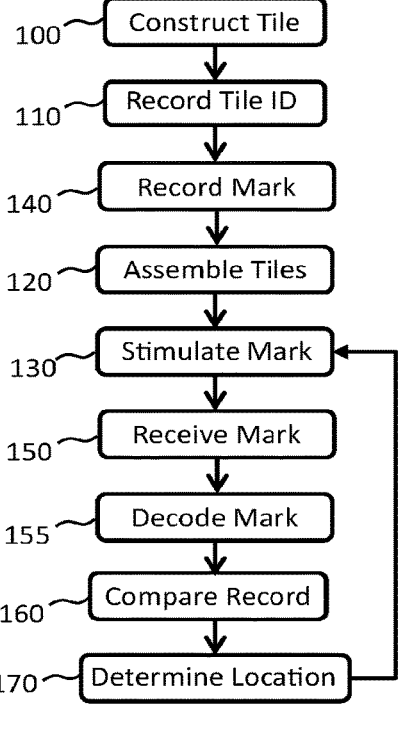
FIGS. 4-5 are flow diagrams of calibration methods for a tiled photonic interactive screen according to illustrative embodiments of the present disclosure.

According to methods of the present disclosure and as illustrated in FIG. 4, methods of constructing and operating a tiled photonic interactive system 15 can comprise providing tiled photonic interactive system 15 in step 100, recording a tile location of each tile 30 with respect to other tiles 30 in step 110, and recording at least one photoluminescent mark 50 disposed on tile 30 in step 140. The record of the at least one photoluminescent mark 50 disposed on tile 30 can be made when tile 30 is constructed. Tile 30 can be marked with a serial number and the serial number can be encoded into photoluminescent marks 50 that are disposed on the corresponding tile 30. Tiles 30 are assembled in step 120. The tile 30 location record can be made after tiles 30 are assembled (e.g., by interchanging the order of steps 120 and 140 in FIG. 4) or a record can be made before tiles 30 are assembled and the tile 30 assembly made according to the record (as shown in FIG. 4). Thus, a unique photoluminescent mark 50 is associated in a record with an individual tile 30 and the location of tile 30 with respect to all other tiles 30 in tiled photonic interactive screen 10. Moreover, each photoluminescent mark 50 comprises a pattern encoding information specifying or identifying the location of photoluminescent mark 50 on tile 30. Thus, the photoluminescent mark 50 location information on corresponding tile 30 can be combined with the tile ID, photoluminescent mark 50 location in corresponding tile 30, and tile location of corresponding tile 30 to determine the location of photoluminescent mark 50 in array 40 of tiles 30. In some embodiments, each unique photoluminescent mark 50 directly encodes a tile 30 identification, for example a serial number. In some embodiments, photoluminescent mark 50 directly encodes a tile 30 location in array 40 of tiles 30 and tiles 30 assembled according to the encoded information. Each serial number can be unique within an array 40 of tiles 30 to avoid conflicting information. However, tiles 30 can have a common serial number if they are disposed in different tiled photonic interactive screens 10.

Once tiled photonic interactive screen 10 is constructed (e.g., in steps 100-120), it can be put into use. In step 130, a photoluminescent mark 50 of at least one tile 30 is exposed to stimulating electromagnetic radiation and the encoded information from photoluminescent mark 50 is received in step 150, for example by camera 64. The encoded information is then decoded in step 155, for example by communication circuit 69, and communicated, for example to display controller 24. In step 160, the decoded information is compared to the records of photoluminescent marks 50 and tiles 30 to determine in step 170 the location of photoluminescent mark 50 on tile 30, the identity of tile 30 on which the encoded information was disposed, the location of identified tile 30 within array 40 of tiles 30, and the location of photoluminescent mark 50 within array 40 of tiles 30. Any one or more of these steps can be performed in optical stylus 60 and communicated to display controller 24 or information can be communicated to display controller 24 and any one or more of the steps can be performed by display controller 24. The process of operating tiled photonic interactive system 15 can then be repeated as desired by a user.

Figure 5:
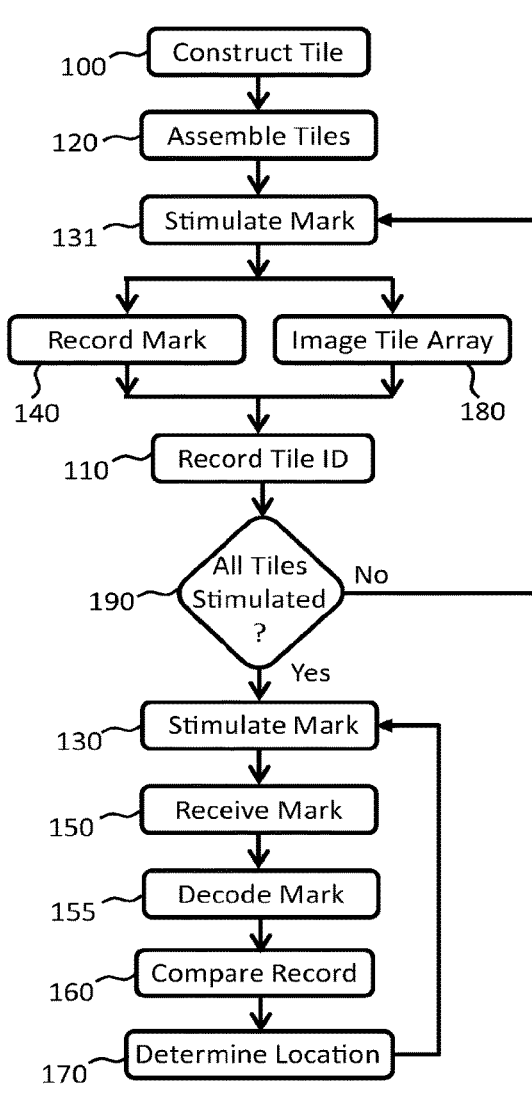

As shown in FIG. 5 and according to some embodiments of the present disclosure, when tiles 30 are assembled into an array 40, a record of the location of each tile 30 is not made. Instead, after tiled photonic interactive screen 10 and tiled photonic interactive system 15 is assembled but before they are put into use, a photoluminescent mark 50 of each tile 30 is stimulated and the response recorded (e.g., by camera 64) together with the location of the stimulated photoluminescent mark 50 in array 40 of tiles 30 (e.g., by making an image of the entire array 40 of tiles 30 and performing image processing to determine the location of the stimulated photoluminescent marks 50 within array 40 of tiles 30). This record can then be used to determine the location of stimulated photoluminescent marks 50 within array 40 of tiles 30 when tiled photonic interactive system 15 even if optical stylus 60 only records the pattern of individual marks 55 in one or a few neighboring photoluminescent marks 50.

Figure 3C:
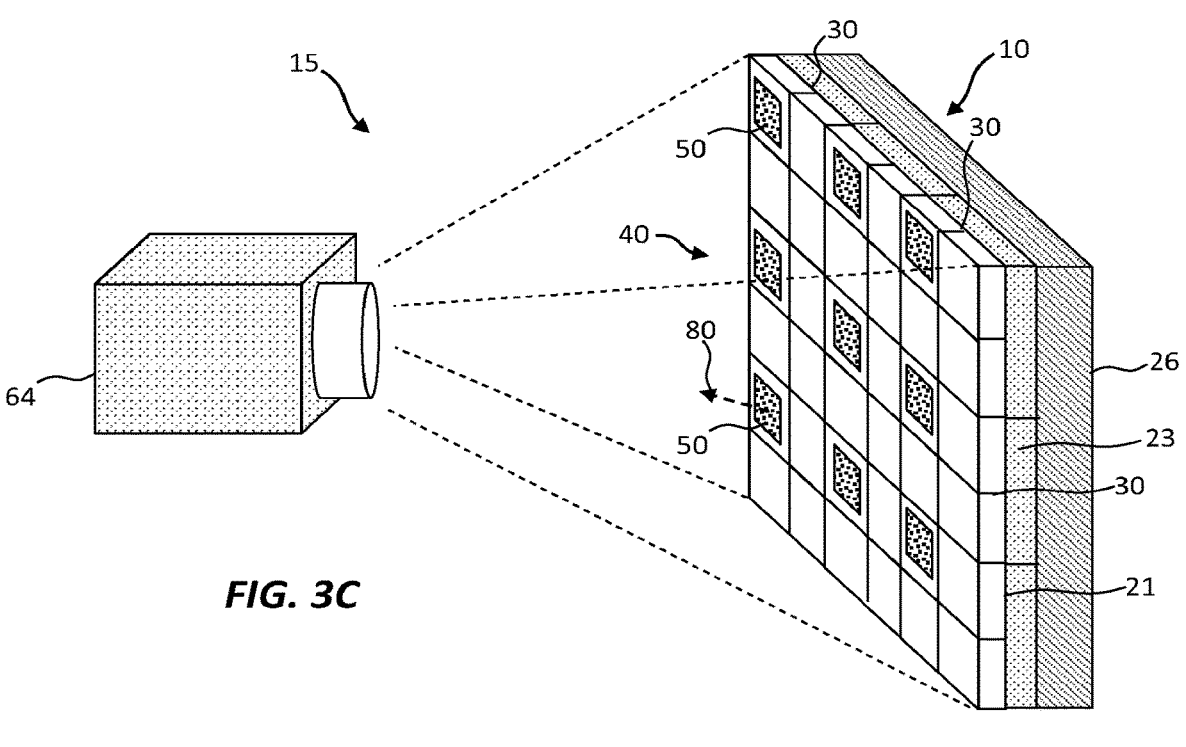
Figure 3D:
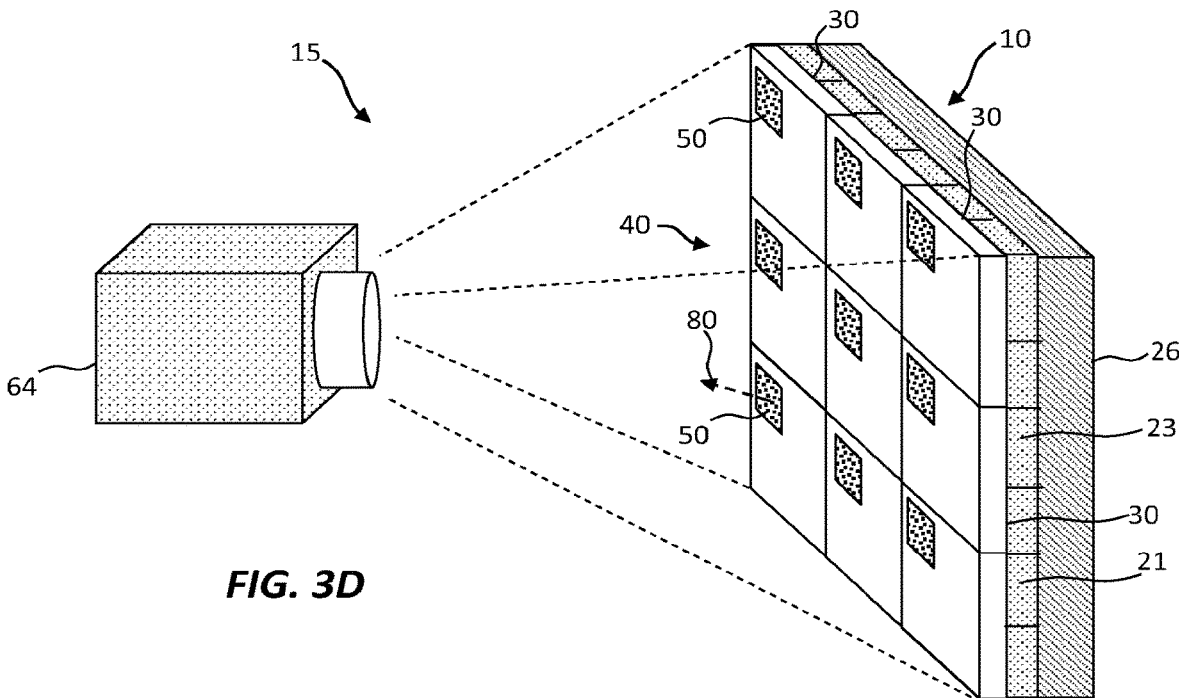

As shown in FIG. 5, tiled photonic interactive screen 10 is constructed by constructing tile 30 in step 100 and then assembling tiles 30 into an array 40 on mounting surface 20, for example by affixing tiles 30 to a surface of a display 22, in step 120. A photoluminescent mark 50 in each tile 30 is stimulated by stimulating light 70 in step 131, photoluminescent mark 50 is recorded in association with tile 30 in step 140, and the location of tile 30 in array 40 of tiles 30 is recorded in step 180, and the tile ID recorded in step 110. Steps 140, 180, and 110 can be done simultaneously or consecutively or in any desirable order. For example, FIG. 3A illustrates camera 64 recording photoluminescent marks 50 on each tile 30 after stimulating photoluminescent marks 50. FIG. 3B illustrates each tile 30 mounted on an individual display tile 23 of a tiled display 22 mounted in a mechanical frame 26. FIG. 3C illustrates multiple tiles 30 mounted on each display tile 23 of a tiled display 22 mounted in a mechanical frame 26. FIG. 3D illustrates each tile 30 mounted on multiple display tiles 23 of a tiled display 22 mounted in a mechanical frame 26. In any of these embodiments, the stimulation can be performed sequentially, for example by tracing a beam of light from a narrow-beam optical stylus 60 over array 40 of tiles 30 in any desired order, and a decision made in step 190 whether to continue stimulating tiles 30 after each tile 30 is stimulated. According to some embodiments, all of tiles 30 can be stimulated at the same time with a broad beam of stimulating light 70 that stimulates all of tiles 30 in a single exposure (e.g., a flash). In such a case, camera 64 must have sufficient resolution to record emitted light 80 from all of photoluminescent marks 50 on all of tiles 30 at the same time. The tile identification, tile location, and photoluminescent mark 50 information can be associated in a calibration step. A separate camera 64 can be used for the calibration than camera 64 in optical stylus 60.

After a record of the tile locations and associated photoluminescent marks 50 for all of tiles 30 in array 40 of tiles 30 is completed, tiled photonic interactive screen 10 can be put into service in a tiled photonic interactive system 15 by stimulating a photoluminescent mark 50 in step 130, for example with light source 62 in optical stylus 60, receiving stimulated photoluminescent mark 50 in step 150, for example with a camera 64 in optical stylus 60, decoding received photoluminescent mark 50 in step 155 to provide location information, for example with communication circuit 69 in optical stylus 60 or in display controller 24, comparing photoluminescent mark 50 location information with the record of tiles 30 in step 160, for example with communication circuit 69 in optical stylus 60 or in display controller 24, and determining photoluminescent mark 50 location in step 170, for example with communication circuit 69 in optical stylus 60 or in display controller 24. The location information can then be provided to display controller 24, if the location information is not already present in display controller 24 and acted upon by display 22 and any user interaction system of which tiled photonic interactive system 15 is a part.

Figure 6:
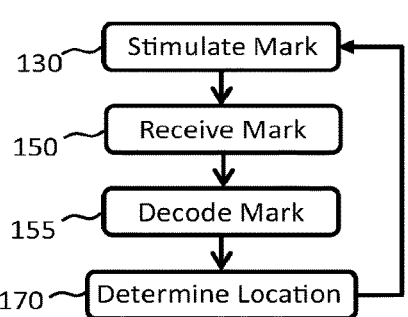
FIG. 6 is a flow diagram of decoding methods for a tiled photonic interactive screen according to illustrative embodiments of the present disclosure.

In some embodiments of the present disclosure, photoluminescent marks 50 encode a location of photoluminescent marks 50 in corresponding tile 30 and a corresponding tile 30 location in array 40 of tiles 30 for tile 30 on which photoluminescent marks 50 are disposed. In such embodiments and as illustrated in FIG. 6, reference to a record (e.g., step 160) is not necessary so that decoded photoluminescent marks 50 are all that is necessary to determine the location of photoluminescent marks 50. Thus, a record is not necessary where tiled photonic interactive screen 10 is constructed with such photoluminescent marks 50. In operation, therefore, photoluminescent marks 50 are stimulated in step 130, received in step 150, decoded in step 155, and a location determined in step 170. The location information can then be provided to display controller 24, if the location information is not already present in display controller 24 and acted upon by display 22 and user interaction system of which tiled photonic interactive system 15 is a part.

Figure 7A:
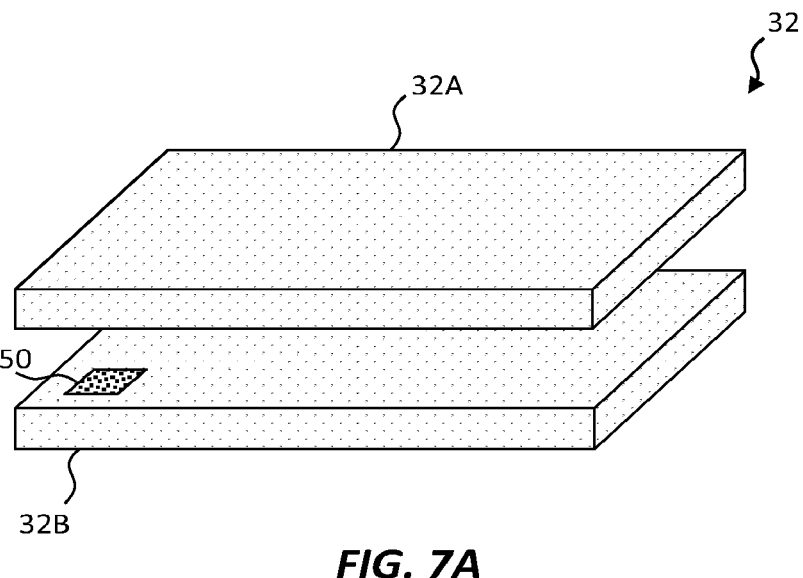
FIGS. 7A-7C are exploded perspectives of a tile substrate comprising multiple layers according to illustrative embodiments of the present disclosure.
Figure 7B:
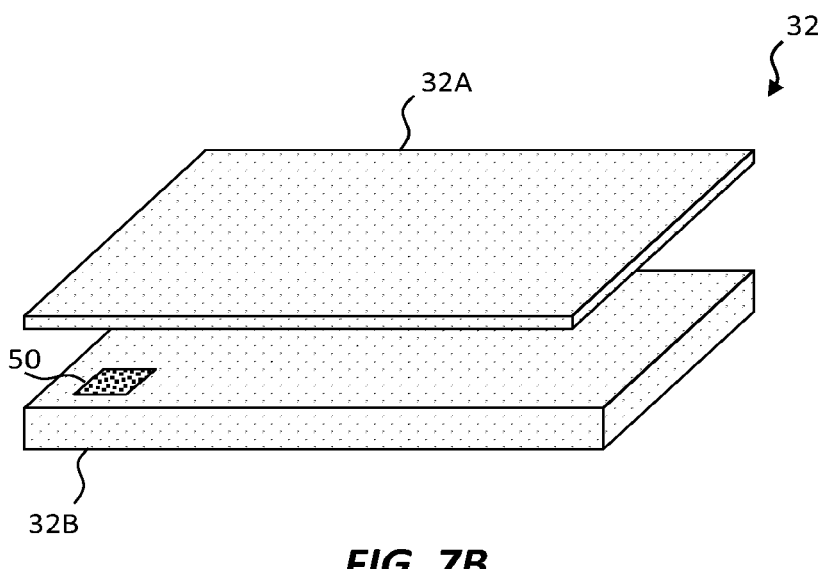

According to some embodiments of the present disclosure, tile substrates 32 can have a thickness from 0.1 mm to 3 mm, for example substantially 0.05 mm, 0.1 mm, 0.2 mm, 0.5 mm, 0.7 mm, or 1 mm and can comprise borosilicate glass or boro-aluminosilicate glass. In some embodiments, tile substrate 32 comprises polymer and is flexible. In some embodiments and as illustrated in FIG. 7A, tile substrate 32 can comprise layers, for example two relatively thin tile-substrate layers 32A, 32B of glass or plastic bonded together. Tile-substrate layers 32A, 32B can be substantially transparent to light. In some embodiments, tile substrate 32 comprises two glass sheets (e.g., tile-substrate layers 32A, 32B), each glass sheet having a thickness less than 0.7 mm (e.g., 0.5 mm) that are bonded together. In some embodiments, tile substrate 32 comprises two polymer or plastic sheets (e.g., tile-substrate layers 32A, 32B) bonded together. Plastic sheets can be thinner than glass sheets, for example 20 microns, 50 microns, or 100 microns thick. In some embodiments and as illustrated in FIG. 7B, tile substrate 32 comprising a plastic sheet (tile-substrate layer 32A) bonded onto a glass sheet (tile-substrate layer 32B). The plastic sheet can be thinner than the glass sheet.

A tile substrate 32 that comprises multiple layers can be stronger and more resistant to breaking, for example from mechanical shocks due to mishandling. A polymer tile substrate 32 can be flexible and very resistant to shattering when dropped. A tile substrate 32 comprising a first layer that is polymer and a second layer that is glass can combine strength and rigidity with safety. If the glass layer is dropped and shatters, the plastic layer can keep the glass in position in tile substrate 32. In some embodiments and as shown in FIG. 7C, tile substrate 32 comprises a glass tile-substrate layer 32B sandwiched between plastic tile-substrate layers 32A, 32C on either side (top and bottom) of glass tile-substrate layer 32B to protect users if glass tile-substrate layer 32B shatters.

According to embodiments of the present disclosure, photoluminescent marks 50 can be disposed on a surface of one of tile-substrate layers 32A, 32B that faces the other of tile-substrate layers 32A, 32B (e.g., an inside surface of any of tile-substrate layers 32A, 32B, 32C) so that photoluminescent marks 50 are not exposed to environmental or user hazards. As illustrated in FIGS. 1C, 1F-1H, photoluminescent marks 50 and individual marks 55 can be disposed on a surface of tile substrate 32 that is adjacent to mounting surface 20 (e.g., a surface of display 22) so that photoluminescent marks 50 and individual marks 55 are protected from handling or other environmental hazards.

Figure 7C:
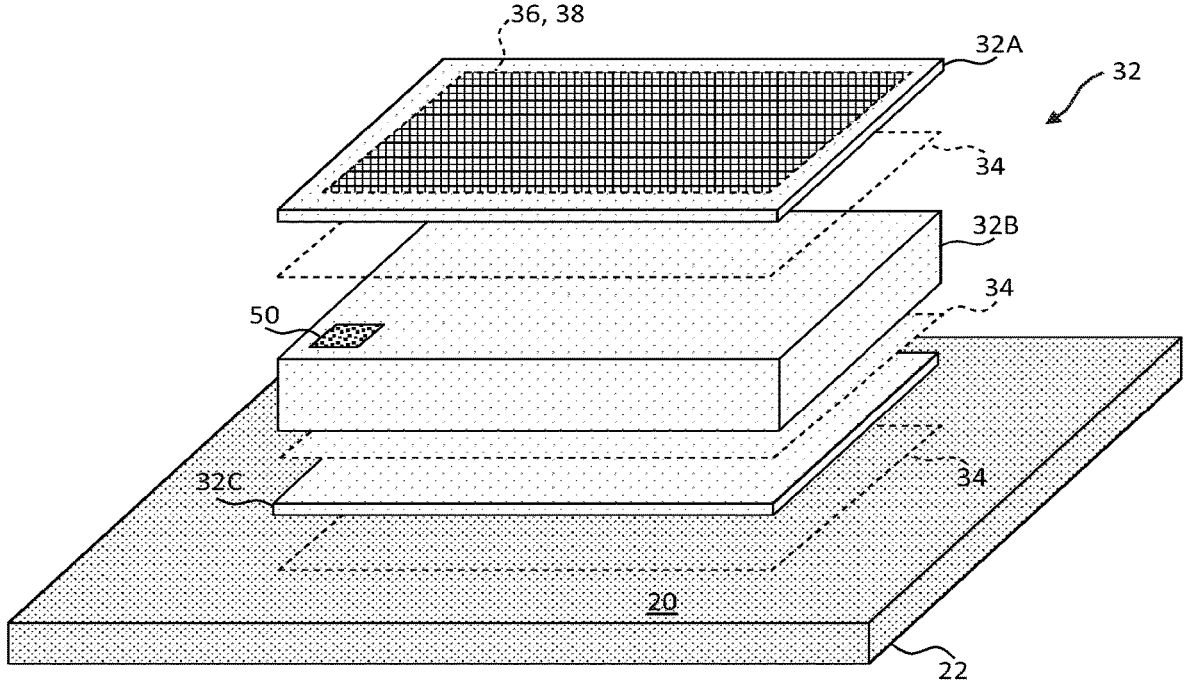

In embodiments of the present disclosure and as shown in FIG. 7C, tile-substrate layers 32A, 32B, 32C are adhered to tile substrates 32 and to mounting surface 20 with an adhesive 34, for example an optically clear adhesive 34 coated in a layer over a surface of tile-substrate layers 32A, 32B, 32C or mounting surface 20. In some embodiments, adhesive 34 is optical index matched to tile substrate 32 or tile-substrate layers 32A, 32B, 32C or to mounting surface 20 (e.g., a cover glass of display 22). By using an index-matched adhesive 34, in seams between tile substrates 32 where tile substrates 32 join together, between tile-substrate layers 32A, 32B, or 32C, or where tile substrate 32 adheres to mounting surface 20, reflection or refraction of light in tiled photonic interactive screen 10 is reduced or eliminated.

In some embodiments of the present disclosure, tile substrate 32, e.g., the surface of tile substrate 32 opposite and most distant from mounting surface 20, is coated with an anti-reflection coating 36 or anti-glare coating 36 to reduce light reflections from tiles 30. Reducing light reflections from tiled photonic interactive screen 10 improves the contrast of photoluminescent marks 50 and display 22 disposed in association with tiled photonic interactive screen 10, thereby improving the appearance of tiled photonic interactive screen 10 and display 22 and making photoluminescent marks 50 and display pixels more visible or readily detected by camera 64. In some such embodiments, it is not necessary to coat mounting surface 20 with anti-reflection coating 36 or anti-glare coating 36 (as is commonly done with display 22 cover glass) because such coatings 36 are provided on tiles 30. If tile substrate 32 comprises multiple layers (e.g., tile-substrate layers 32A, 32B), according to some embodiments the layer (e.g., tile-substrate layer 32A) farthest from mounting surface 20 can be coated with anti-reflection coating 36 or anti-glare coating 36 and a different layer (e.g., tile-substrate layer 32B) can incorporate photoluminescent marks 50. By providing different tile-substrate layers 32A, 32B with different functions and structures made in different processes, the processing for each tile-substrate layer 32A, 32B is simplified and manufacturing costs are reduced.

According to some embodiments of the present disclosure, optical or physical structures are provided between tile substrates 32 (e.g., at seams or edges between tiles 30) to control light that might diffract, refract, or reflect from tile substrate 32 surfaces or gaps between tile substrates 32.

According to some embodiments (as indicated in FIG. 7C), a black matrix 38 can be applied to a surface of tile substrates 32 to absorb ambient light incident on tiles 30 and improve the contrast of tiled photonic interactive screen 10, thereby improving the appearance of tiled photonic interactive screen 10 and display 22 and making photoluminescent marks 50 and display pixels more visible or readily detected by camera 64. Black matrix 38 can be patterned to make openings around individual marks 55 or photoluminescent marks 50 so that individual marks 55 or photoluminescent marks 50 are not obscured by black matrix 38 when exposed to or emitting light (e.g., stimulating light 70 or emitted light 80). In some embodiments, black matrix 38 can be patterned to make openings around pixels in display 22 so that the light emitted from display 22 pixels are not obscured by black matrix 38 when displaying images. In some such embodiments, it is not necessary to provide a black matrix 38 in display 22 (as is commonly done with display 22 cover glass) if black matrix 38 is provided in tiled photonic interactive screen 10. If tile substrate 32 comprises multiple layers (e.g., tile-substrate layers 32A, 32B, 32C), according to some embodiments the layer (e.g., tile-substrate layer 32A) farthest from mounting surface 20 can be coated with black matrix 38 and a different layer (e.g., tile-substrate layer 32B) can incorporate photoluminescent marks 50. By providing different tile-substrate layers 32A, 32B with different functions and structures made in different processes, the processing for each tile-substrate layer 32A, 32B is simplified and manufacturing costs are reduced.

Figure 8A:
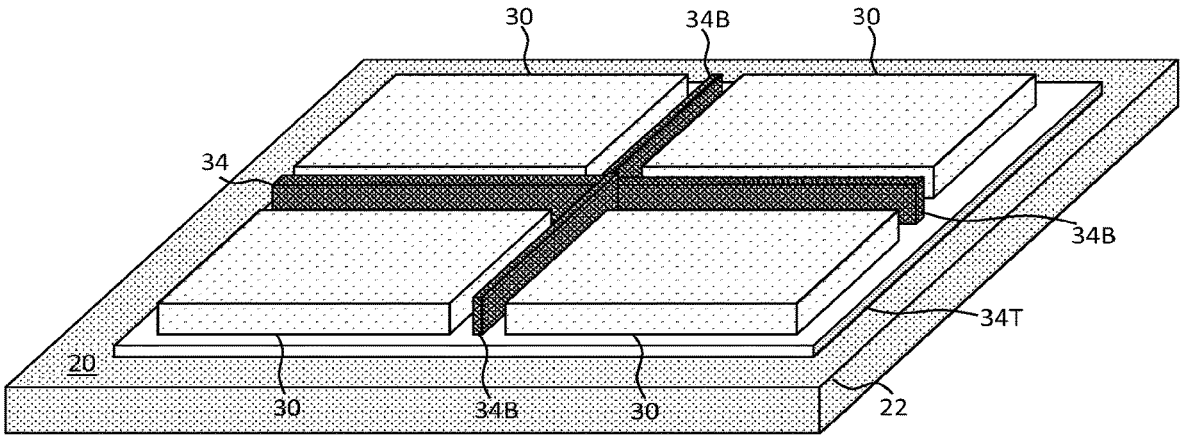
FIG. 8A is an exploded perspective and FIG. 8B is a cross section of tile substrates adhered with light-absorbing adhesive, paint, or film coating and light-transparent adhesive, paint, or film coating according to illustrative embodiments of the present disclosure.
Figure 8B:
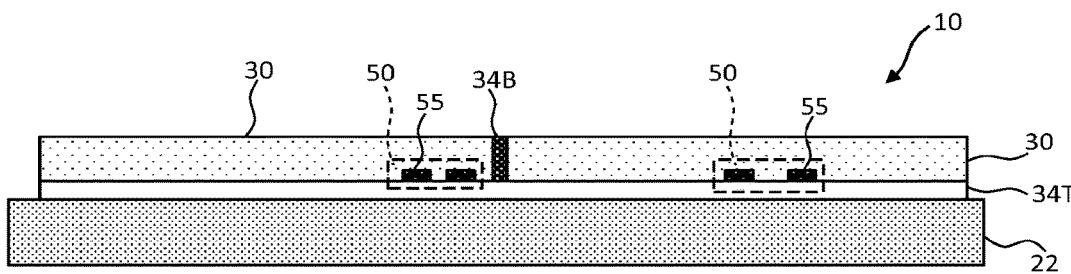

In some embodiments and as shown in FIGS. 8A and 8B, a light-absorbing adhesive 34B is disposed between tiles 30 (e.g., between tile substrates 32) to absorb incident ambient light, especially where tiles 30 are relatively thin compared to a pixel pitch in display 22 or a pitch of photoluminescent marks 50 to avoid parallax viewing issues and to improve contrast for users. Tile-substrate layers 32A, 32B, 32C can be adhered together using a light-transparent adhesive 34T. Light-transparent adhesive 34T can also be used in FIGS. 7A-7C where adhesive 34 is referenced.

Figure 9A:
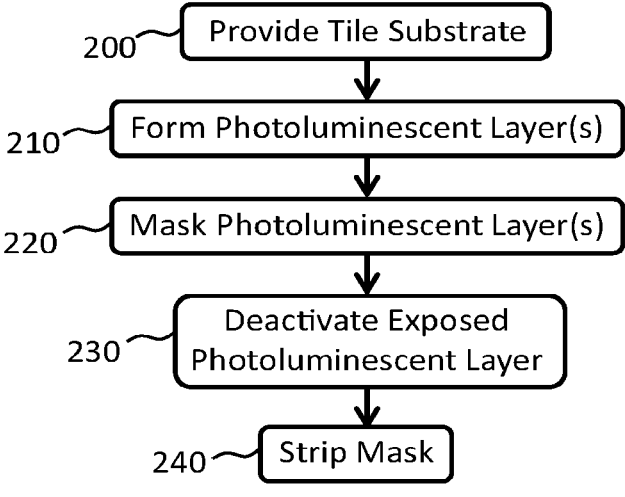
FIGS. 9A and 9B are flow diagrams of construction methods according to illustrative embodiments of the present disclosure.
Figure 9B:
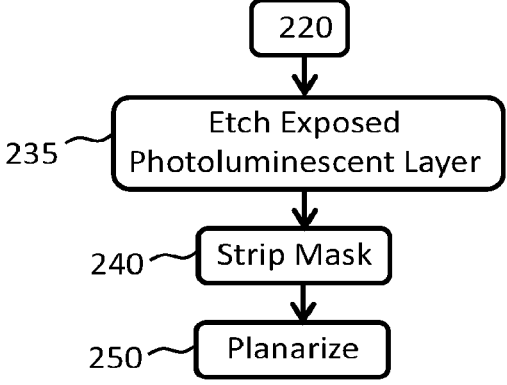

According to embodiments of the present disclosure and as illustrated in the flow diagrams of FIGS. 9A and 9B and the sequential structures of FIGS. 10A-10D, 11A-11B, and 12A-12D, methods of constructing tiled photonic interactive screens 10 comprise providing tile substrate 32 (for example a glass tile) in step 200 as shown in FIG. 10A and forming photoluminescent layer 52 in step 210 as shown in FIG. 10B, for example as described above. In step 220, photoluminescent layer 52 is masked, for example by coating photoluminescent layer 52 with a layer of photoresist and using photolithographic methods and materials to expose the photoresist layer through an optical mask and etch the exposed photoresist layer to form patterned mask 54 over photoluminescent layer 52, as shown in FIG. 10C. As shown in FIG. 10D, in step 230 photoluminescent layer 52 is patterned using a deactivation exposure 56 where patterned photoresist mask 54 is not present to deactivate exposed portions 53 of photoluminescent layer 52 and pattern photoluminescent layer 52 to form individual marks 55 of photoluminescent marks 50.

Figure 11A:
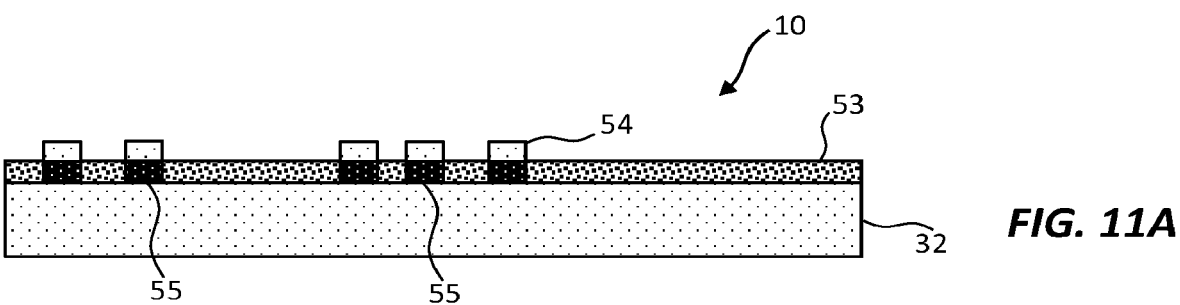
FIGS. 11A-11B are sequential structures formed according to illustrative methods of the present disclosure.
Figure 11B:
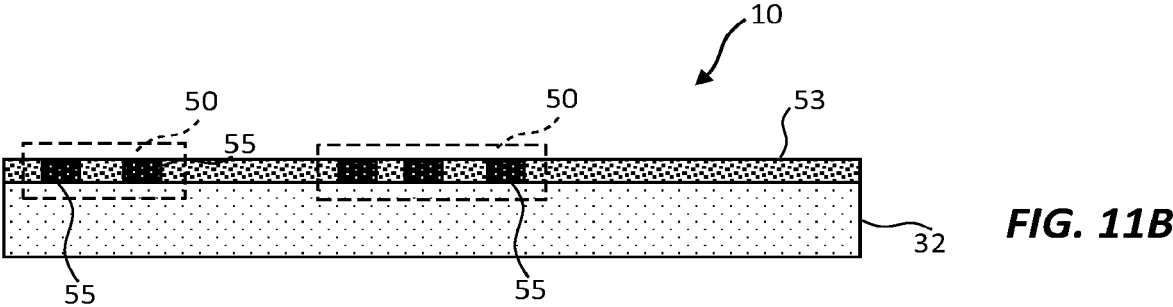

According to some embodiments, the deactivation exposure 56 of step 230 can be a shower of energetic particles (e.g., ions) that disable any photoluminescent quantum nano-structures (e.g., by modifying the photoluminescent quantum structures to pattern-wise diminish or change the photoluminescent characteristics of photoluminescent layer 52, for example by incorporating ions in the deactivated layer) and does not remove photoluminescent layer 52 material, leaving deactivated portions 53 of photoluminescent layer 52 in place, resulting in a structure such as that illustrated in FIG. 11A. Suitable ions can include ions of Oxygen, Nitrogen, Hydrogen, Helium, Neon, Argon, Magnesium, Lithium, Beryllium, Boron, Phosphor, Aluminum, Zinc, Arsenic, Gallium, Silicon, Cadmium, and/or any kind of element capable of degrading the photoluminescent stack. The ions can create non-radiative defects in unmasked portions of photoluminescent layer 52, and thus locally deactivate its photoluminescent ability. Exposing photoluminescent layer 52 to energetic particles, such as ions, can be a relatively low-cost way to deactivate portions 53 of photoluminescent layer 52 and form individual marks 55. According to some embodiments, stacks comprising AlN/GaN layers can be pattern-wise deactivated with Ar or $N_2$ and stacks comprising $ZnO/SiO_2$ layers can be pattern-wise deactivated with Ar, $N_2$, or $O_2$. Remaining mask 54 photoresist can be removed in step 240 and as shown in FIG. 11B using photolithographic methods and materials, leaving individual marks 55 forming photoluminescent marks 50. Thus, in some such embodiments the deactivated photoluminescent layer 52 material (deactivated portions 53) remain in place providing a planarized surface useful for applying subsequent layers or coatings, for example antireflection layers, by spray, spin, or slot coating or by lamination or for application to mounting surface 20. Embodiments comprising deactivated portions 53 of photoluminescent layer 52 can be useful for large-format non-tiled displays 22 because deactivated portions 53 can have an optical index that is the same as the active portions (e.g., individual marks 55) of photoluminescent layer 52 so that photoluminescent layer 52 does not appear to have any distracting structure, for example with large liquid crystal displays 22.

Figure 12A:
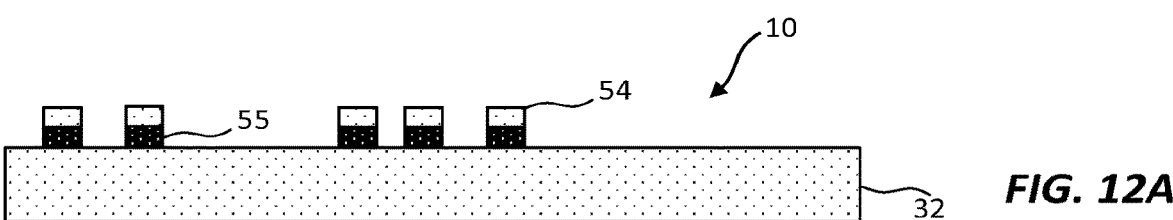
FIGS. 12A-12D are sequential structures formed according to illustrative methods of the present disclosure.
Figure 12B:
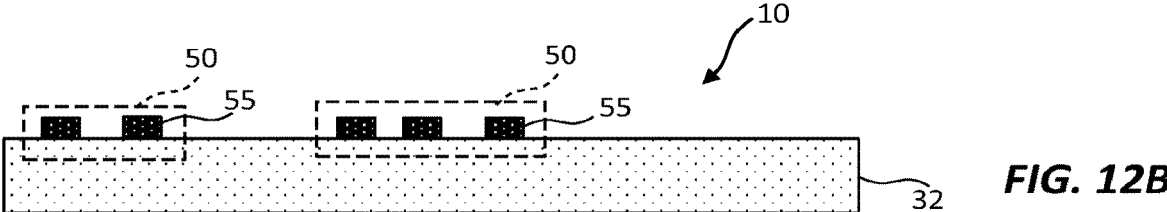
Figure 12C:
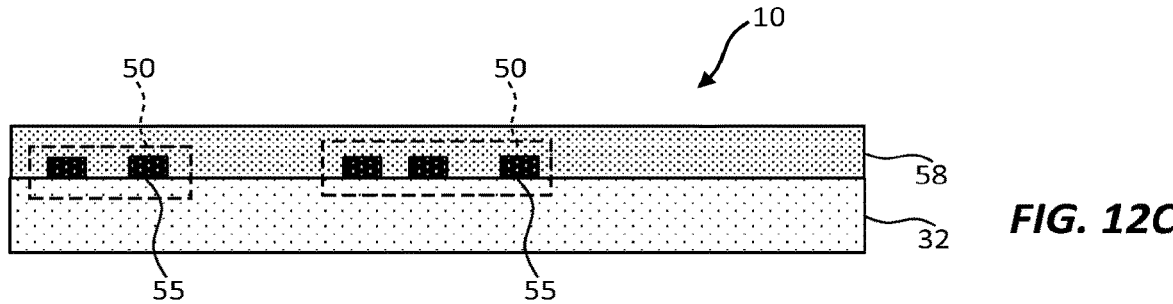
Figure 12D:
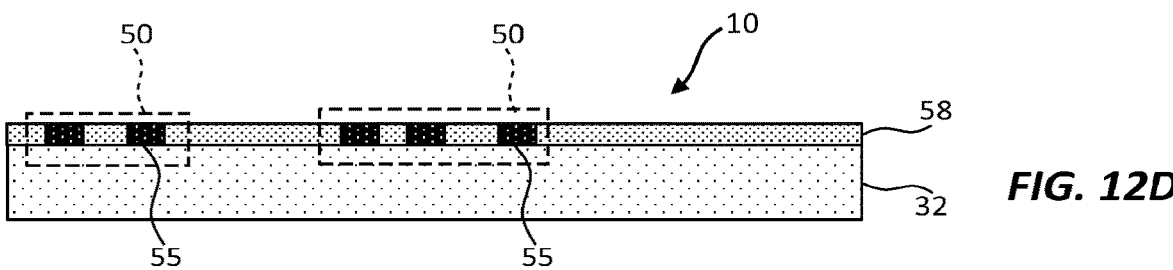

As shown in the flow diagram of FIG. 9B and the sequential structures of FIGS. 12A-12D and according to some embodiments of the present disclosure, after photoluminescent layer 52 is masked with mask 54 in step 220, step 235 patterns photoluminescent layer 52 by etching photoluminescent layer 52 (e.g., with dry etching such as Argon plasma etching or Oxygen plasma etching) and physically removing portions of photoluminescent layer 52, for example by rinsing and exposing corresponding portions of tile substrate 32, as shown in FIG. 12A. Remaining mask 54 photoresist can be removed in step 240 using photolithographic methods and materials and as shown in FIG. 12B, leaving individual marks 55 forming photoluminescent marks 50. Optionally and if desired, patterned photoluminescent layer 52 (e.g., the layer including individual marks 55) can be planarized by coating (e.g., spray, spin, or curtain coating) a planarization layer 58 (for example comprising a curable liquid resin) in step 250 and as shown in FIG. 12C. In some embodiments, tile substrate 32, tile 30, or both, comprises planarization layer 58. Planarization layer 58 can be deposited at a desired thickness (e.g., co-planar with individual marks 55 or extending slightly above individual marks 55) or etched to the desired thickness, for example by exposure to energetic particles, dry etchants, or liquid etchants. A planarized surface can be useful for applying subsequent layers or coatings, for example antireflection layers, by spray, spin, or slot coating or by lamination or for application to mounting surface 20. Embodiments comprising removed portions of photoluminescent layer 52 can be useful for tiled displays 22, such as inorganic LED tiles used in large-format displays 22, because the optional planarization layer 58 can be complementary to adhesives and coatings used with display tiles 23.

As is understood by those skilled in the art, the terms "over", "under", "above", "below", "beneath", and "on" are relative terms and can be interchanged in reference to different orientations of the layers, elements, and substrates included in the present disclosure. As is also understood by those skilled in the art, the terms "horizontal" and "vertical", and "x" and "y" are arbitrary designations that can be interchanged.

Having described certain embodiments, it will now become apparent to one of skill in the art that other embodiments incorporating the concepts of the disclosure may be used. Therefore, the invention should not be limited to the described embodiments, but rather should be limited only by the spirit and scope of the following claims.

Throughout the description, where apparatus and systems are described as having, including, or comprising specific components, or where processes and methods are described as having, including, or comprising specific steps, it is contemplated that, additionally, there are apparatus, and systems of the disclosed technology that consist essentially of, or consist of, the recited components, and that there are processes and methods according to the disclosed technology that consist essentially of, or consist of, the recited processing steps.

It should be understood that the order of steps or order for performing certain action is immaterial so long as the disclosed technology remains operable. Moreover, two or more steps or actions in some circumstances can be conducted simultaneously. The invention has been described in detail with particular reference to certain embodiments thereof, but it will be understood that variations and modifications can be effected within the spirit and scope of the invention.

PARTS LIST

A cross section line
10 tiled photonic interactive screen
15 tiled photonic interactive system
20 mounting surface
21 tiled mounting surface
22 display
23 display tile
24 display controller
26 mechanical frame/display frame
30 tile/screen tile

32 tile substrate
32A, 32B, 32C tile substrate layer
34 adhesive
34B light-absorbing adhesive
34T light-transparent adhesive
36 anti-reflection coating/anti-glare coating
38 black matrix
40 array
50 photoluminescent mark
52 photoluminescent layer
53 deactivated portion
54 mask
55 individual mark
56 deactivation exposure
58 planarization layer
60 optical stylus
62 light source
64 emitted-light receiver/camera
66 optical element
68 control switch
69 communication circuit
70 stimulating light
80 emitted light
100 construct tile step
110 record tile ID step
120 assemble tile step
130 stimulate mark step
131 stimulate mark step
140 record mark step
150 receive mark step
155 decode mark step
160 compare record step
170 determine location step
180 image tile array step
190 all tiles stimulated step
200 provide tile substrate step
210 form photoluminescent layer step
220 mask photoluminescent layer step
230 deactivate exposed photoluminescent layer step
235 etch exposed photoluminescent layer step
240 strip mask step
250 planarize step

What is claimed:

1. A tiled photonic interactive screen, comprising:
a mounting surface; and
tiles mounted on the mounting surface, each tile comprising a tile substrate with unique photoluminescent marks disposed in an array on the tile substrate,
wherein the unique photoluminescent marks comprise photoluminescent material disposed in a stack of layers, said stack of layers comprising successive alternate first and second layers having a same composition.

2. The tiled photonic interactive screen of claim 1, comprising information encoded in photoluminescent marks on a tile incorporating an identification of the tile or the location of the tile with respect to the tiles mounted on the mounting surface.

3. The tiled photonic interactive screen of claim 1, wherein the tile substrate comprises two or more layers.

4. The tiled photonic interactive screen of claim 3, wherein the photoluminescent marks are disposed between the tile substrate and the mounting surface or between two layers of the two or more layers.

5. The tiled photonic interactive screen of claim 3, wherein the two or more layers are adhered to each other or to the mounting substrate with an index-matched optically clear adhesive.

6. The tiled photonic interactive screen of claim 1, wherein the tile substrates are adhered together with a light-absorbing adhesive.

7. The tiled photonic interactive screen of claim 1, wherein the mounting surface is a tiled mounting surface comprising mounting tiles, and (i) one tile is mounted on each mounting tile, (ii) multiple tiles are mounted on each mounting tile, or (iii) a tile is mounted on multiple mounting tiles.

8. The tiled photonic interactive screen of claim 1, wherein the stack of layers is treated in a pattern to provide non-photoluminescent portions of the stack.

9. The tiled photonic interactive screen of claim 1, wherein the successive alternate first and second layers generate photoluminescent structures at the interface of said first layers and said second layers.

10. A method of making a tiled photonic interactive screen, comprising:

providing a tiled substrate;

disposing a photoluminescent layer comprising quantum nano-structures on the tiled substrate;

masking the photoluminescent layer to form masked portions and unmasked portions;

deactivating unmasked portions of the photoluminescent layer; and removing the mask.

11. The method of claim 10, wherein deactivating unmasked portions of the photoluminescent layer comprises exposing the unmasked portions to energetic particles.

12. The method of claim 10, wherein deactivating unmasked portions of the photoluminescent layer comprises exposing etching the unmasked portions to expose corresponding unmasked portions of the tile substrate.

13. The method of claim 12, comprising planarizing the photoluminescent layer.

* * * * *